W. W. KIMMEL.
MILKING PAIL ATTACHMENT.
APPLICATION FILED JUNE 1, 1911.
1,015,189.
Patented Jan. 16, 1912.
3 SHEETS—SHEET 1.
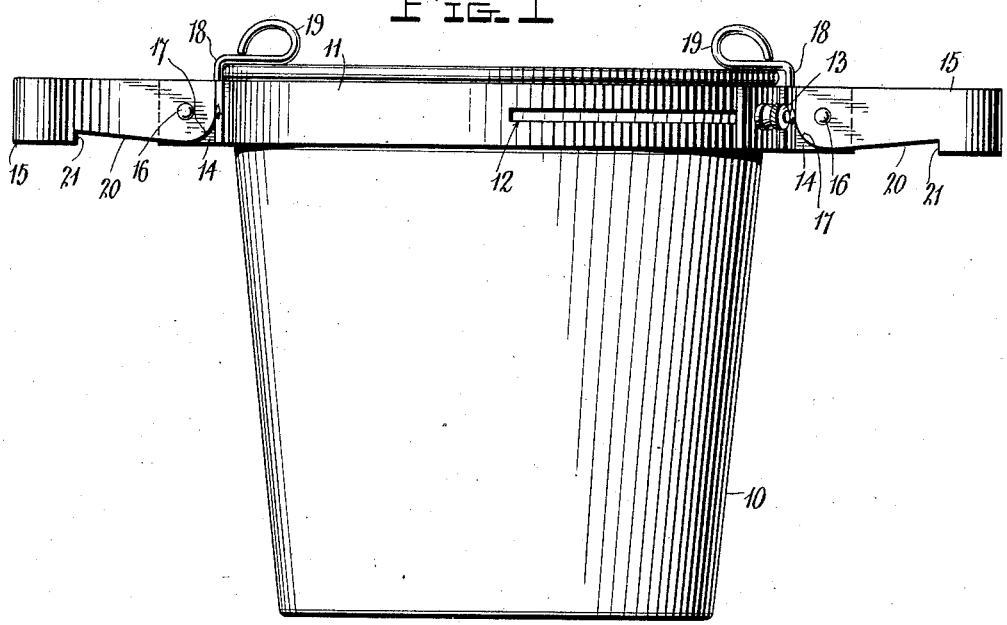
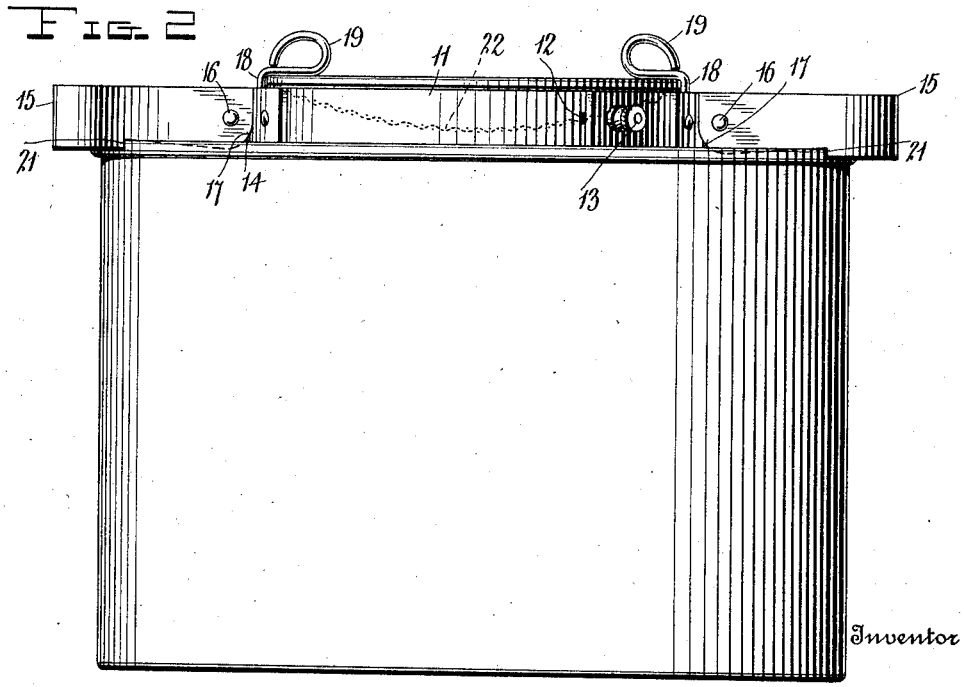
Witnesses
Francis Boyle
Inventor
W. W. Kimmel,
By
Attorneys W. W. KIMMEL.
MILKING PAIL ATTACHMENT.
APPLICATION FILED JUNE 1, 1911.
1,015,189.
Patented Jan. 16, 1912.
3 SHEETS—SHEET 2.
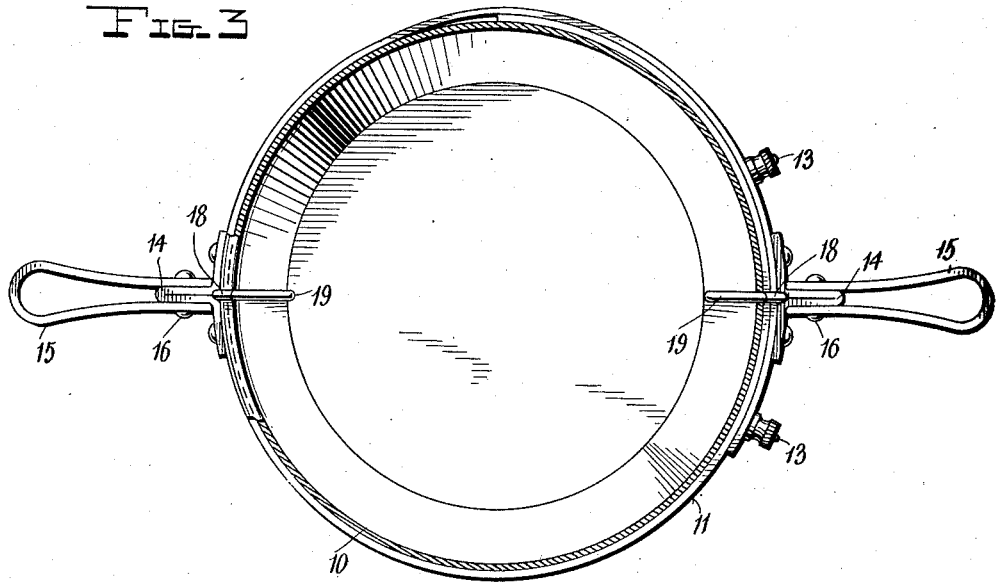
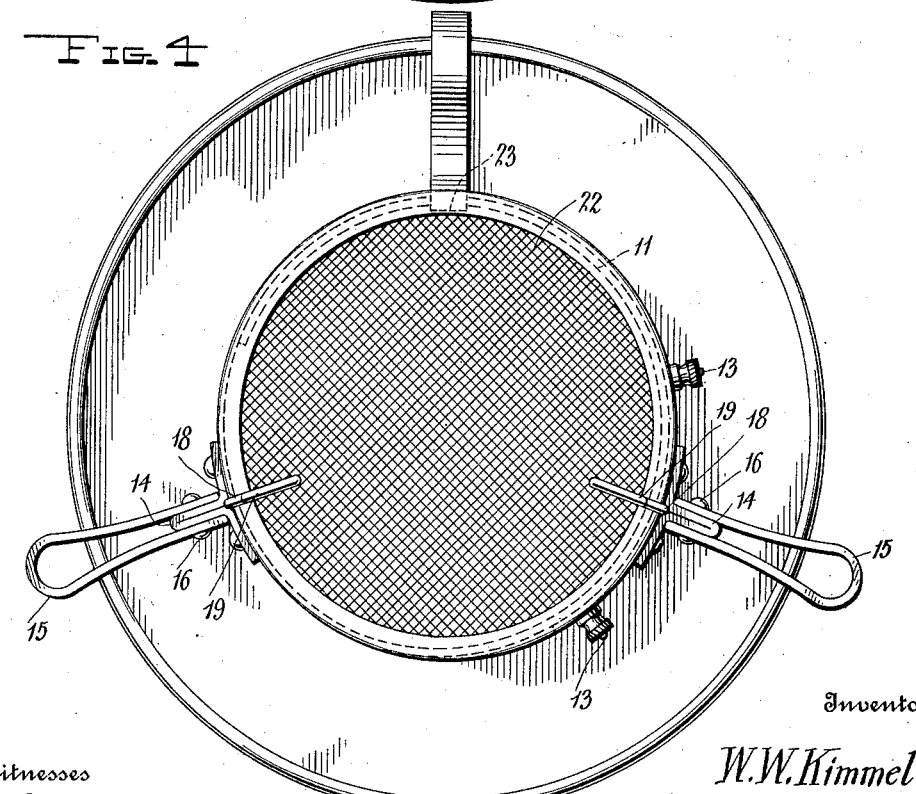
Witnesses
Inventor
W. W. Kimmel
By
Attorneys W. W. KIMMEL.
MILKING PAIL ATTACHMENT.
APPLICATION FILED JUNE 1, 1911.
1,015,189.
Patented Jan. 16, 1912.
3 SHEETS—SHEET 3.
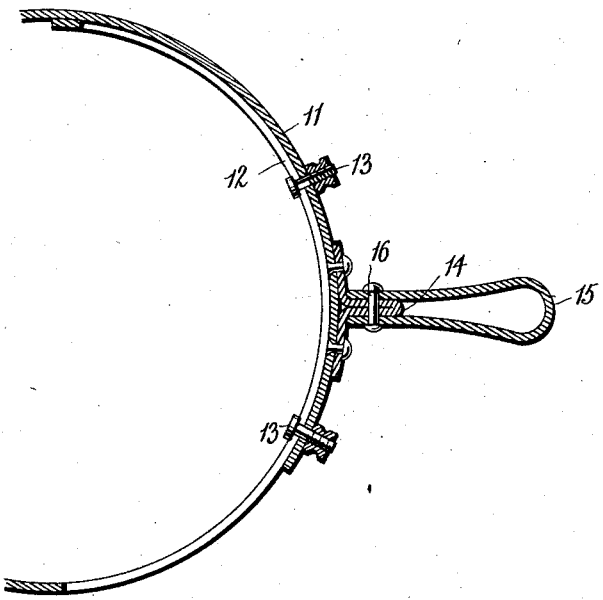
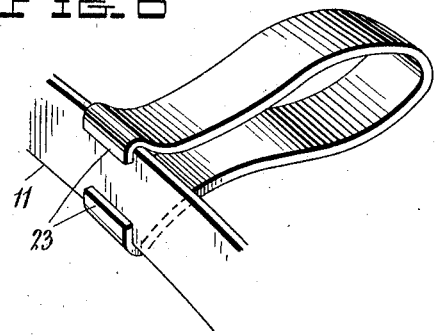
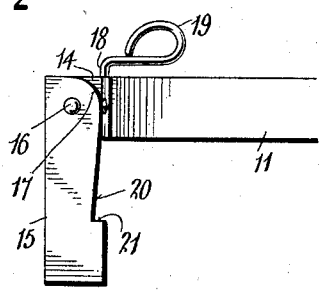
Inventor
W. W. Kimmel,

UNITED STATES PATENT OFFICE.

WILFORD W. KIMMEL, OF NEW WESTON, OHIO.

MILKING-PAIL ATTACHMENT.

1,015,189.  Specification of Letters Patent.  Patented Jan. 16, 1912.

Application filed June 1, 1911. Serial No. 630,639.

*To all whom it may concern:*

Be it known that I, WILFORD W. KIMMEL, a citizen of the United States, residing at New Weston, in the county of Darke, State of Ohio, have invented certain new and useful Improvements in Milking-Pail Attachments; and I do hereby declare the following to be a full, clear, and exact description of the invention, such as will enable others skilled in the art to which it appertains to make and use the same.

This invention relates to milking pail attachments and has for an object to provide a convertible attachment that may be used to support the milking pail between the knees when milking, and may further be used to support a strainer within the throat of a vessel into which the milk from the milking pail is poured.

A second object of the invention is to provide a device in which a single contractile ring having oppositely disposed lugs on its sides, may be clamped upon the outer face of the pail near the rim for supporting the pail from the knees and may be inserted within the pail for supporting the strainer, a single novel resilient loop being attached to the ring when the device is used for supporting a strainer to engage the pail rim and prevent rocking of the ring on its lugs as fulcrums.

With the above objects in view the invention consists in certain novel details of construction and combination of parts hereinafter fully described and claimed, it being understood that various modifications may be made in the minor details of construction within the scope of the appended claims.

In the accompanying drawings forming part of this specification:—Figure 1 is a side elevation of the device attached to the pail for supporting the pail from the knees. Fig. 2 is a side elevation of the device attached to a pail for supporting a strainer therein, portions of the pail being broken away. Fig. 3 is a plan view of the parts shown in Fig. 1. Fig. 4 is a plan view of the parts shown in Fig. 2. Fig. 5 is a cross sectional view through the overlapping ends of the contractile ring. Fig. 6 is a detail perspective view of the resilient loop. Fig. 7 is a fragmentary view showing one of the lugs rocked to released position.

Referring now to the drawings in which like characters of reference designate similar parts, 10 designates a milking pail of ordinary kind. The attachment comprising the subject-matter of this invention consists of a contractile ring 11, the same being formed of a single length of resilient material having its ends overlapping, one of the ends being provided with a longitudinal slot 12, and the other end being provided with spaced adjusting bolts 13 which project through the slot 12 and adjustably secure the ends together. Arranged at diametrically opposite points on the outer face of the ring are ears 14, and to each ear is secured the ends of a loop lug 15, a pivot pin 16 being passed through the ear and ends of the lug to attain this end. The lower corners of the lug legs are rounded as shown at 17 to permit of the lugs being rocked downward into substantially a position at right angles to the plane of the contractile ring as shown in Fig. 7 so that the device may be stored in a minimum space when desired. Secured to the ring at the juncture of the ears therewith are upstanding inturned hooks 18, these hooks having their bills bent into the form of eyes 19 so that no angular projections are presented to mutilate the hands in adjusting the contractile ring to operative position.

In applying the ring to a milking pail for supporting the pail from the knees, the ring is expanded by loosening the adjusting screws, and slipped upon the pail to a position such that the hooks 18 will engage over the rim of the pail as clearly shown in Fig. 1. The ring is now contracted and the adjusting screws tightened to cause the ring to clamp tightly against the pail and prevent the pail from slipping through the ring when the pail is supported upon the knees of the operator by means of the oppositely disposed lugs 15. The hooks it will be noted prevent the ring from dropping down from its applied position to the pail when the pail is not supported from the knees.

When it is desired to use the contractile ring as a support for a strainer, the adjusting screws are loosened and the ring contracted to such an extent that it will readily fit within the mouth of a pail into which the milk from the milking pail is to be poured as shown in Fig. 2. The adjusting bolts are now tightened to maintain the ring in this contracted position. In this position of the parts the lugs 15 will bear upon the rim of the pail, and it will now be seen by referring to Fig. 2 that formed in the underneath faces of both lugs are rabbets 20, the outer ends of the rabbets forming shoulders 21 which bind against the outer sides of the rim of the pail and prevent the device from escaping laterally from the pail. A reticulate disk 22 is now placed upon the top edge of the ring in such a manner that the hooks 18 bear upon the disk and anchor the same in position. To prevent tilting of the strainer thus formed, I provide a supplementary loop which will now be described.

The supplementary loop is formed from a single length of spring material, the legs of which are bent outwardly adjacent their terminals and then inwardly to oppose each other to form clamping hooks 23 which are designed to embrace the edges of the ring and rigidly anchor the loop in position. The loop may be slid to such a position on the ring as to extend outwardly from a point on the ring which is approximately centrally disposed relatively to the two lugs 18, the supplementary loop when in this position bearing upon the rim of the pail and preventing rocking of the ring upon the lugs as fulcrums. Since the loop is formed of resilient material, by simply rocking the loop upon the ring, the legs will move apart sufficiently to enable the loop to be readily passed on to and removed from the ring.

What is claimed, is:—

1. An attachment for milking pails including a contractile ring formed of a single length of resilient material having overlapping ends adjustably secured together, oppositely disposed lugs projecting from said ring and extending in the plane thereof, and a resilient loop having terminal clamping ends detachably engaging said ring.

2. An attachment for milking pails including a contractile ring formed of a single length of resilient material having overlapping ends, one of said ends having a longitudinal slot formed therein, and the other of said ends being equipped with adjusting bolts engaged through said slots, oppositely disposed lugs on said ring having pail engaging rabbets formed in their underneath faces, and a resilient loop having inturned terminals removably embracing said ring.

In testimony whereof, I affix my signature, in presence of two witnesses.

WILFORD W. KIMMEL.

Witnesses:
Jas. B. Kolp,
W. T. Burnett.

---

Copies of this patent may be obtained for five cents each, by addressing the "Commissioner of Patents, Washington, D. C."